United States Patent
Baudry et al.

(10) Patent No.: US 10,081,396 B2
(45) Date of Patent: Sep. 25, 2018

(54) EXTERIOR TRIM PART

(71) Applicant: AUTONEUM MANAGEMENT AG, Winterthur (CH)

(72) Inventors: Fabien Baudry, Stuttgart (DE); Wenzel Krause, Winterthur (CH); Luca Marotta, Winterthur (CH)

(73) Assignee: Autoneum Management AG, Winterthur (CH)

( * ) Notice: Subject to any disclaimer, the term of this patent is extended or adjusted under 35 U.S.C. 154(b) by 0 days.

(21) Appl. No.: 15/306,234

(22) PCT Filed: Apr. 17, 2015

(86) PCT No.: PCT/EP2015/058357
§ 371 (c)(1),
(2) Date: Oct. 24, 2016

(87) PCT Pub. No.: WO2105/165751
PCT Pub. Date: Nov. 5, 2015

(65) Prior Publication Data
US 2017/0043815 A1 Feb. 16, 2017

(30) Foreign Application Priority Data

Apr. 29, 2014 (EP) ..................................... 14166482

(51) Int. Cl.
*B62D 39/00* (2006.01)
*B62D 29/04* (2006.01)
(Continued)

(52) U.S. Cl.
CPC .......... *B62D 29/043* (2013.01); *B29C 70/026* (2013.01); *B29C 70/08* (2013.01);
(Continued)

(58) Field of Classification Search
CPC .... B62D 29/043; B62D 35/02; B29C 70/026; B29C 70/08; B32B 3/266; B32B 5/02;
(Continued)

(56) References Cited

U.S. PATENT DOCUMENTS 3,008,214 A  11/1961 Foster et al.
4,130,175 A  12/1978 Hehmann
(Continued)

FOREIGN PATENT DOCUMENTS

DE  1949209  4/1971
DE  9404621  7/1994
(Continued)

OTHER PUBLICATIONS

International Search Report and Written Opinion prepared by the European Patent Office dated May 18, 2015 for International Application No. PCT/EP2015/058357.
(Continued)

*Primary Examiner* — Lori L Lyjak
(74) *Attorney, Agent, or Firm* — Lewis Brisbois Bisgaard & Smith LLP

(57) ABSTRACT

In accordance with a first aspect of the invention, the exterior trim part for a vehicle comprises a fibrous porous structural layer. The exterior trim part further comprises at least one at least sectional perforated film layer, which is made of thermoplastic polyurethane with a melting temperature according to DSC of at least 140° C. The film layer is materially connected to the fibrous porous structural layer, at least in sections.

20 Claims, 2 Drawing Sheets

(51) Int. Cl.

| | | |
|---|---|---|
| *B32B 5/02* | (2006.01) | |
| *B32B 5/08* | (2006.01) | |
| *B32B 27/12* | (2006.01) | |
| *B32B 27/40* | (2006.01) | |
| *B32B 3/26* | (2006.01) | |
| *B60R 13/08* | (2006.01) | |
| *G10K 11/162* | (2006.01) | |
| *B29C 70/02* | (2006.01) | |
| *B29C 70/08* | (2006.01) | |
| *B60K 11/00* | (2006.01) | |
| *B60R 13/04* | (2006.01) | |
| *B62D 35/02* | (2006.01) | |
| *B29K 75/00* | (2006.01) | |
| *B29K 105/08* | (2006.01) | |
| *B29K 267/00* | (2006.01) | |
| *B29L 31/30* | (2006.01) | |

(52) U.S. Cl.
CPC .............. *B32B 3/266* (2013.01); *B32B 5/02* (2013.01); *B32B 5/08* (2013.01); *B32B 27/12* (2013.01); *B32B 27/40* (2013.01); *B60K 11/00* (2013.01); *B60R 13/04* (2013.01); *B60R 13/0838* (2013.01); *B60R 13/0861* (2013.01); *B62D 35/02* (2013.01); *G10K 11/162* (2013.01); *B29K 2075/00* (2013.01); *B29K 2105/08* (2013.01); *B29K 2267/003* (2013.01); *B29L 2031/302* (2013.01); *B32B 2262/0276* (2013.01); *B32B 2262/0284* (2013.01); *B32B 2262/12* (2013.01); *B32B 2262/14* (2013.01); *B32B 2274/00* (2013.01); *B32B 2307/724* (2013.01); *B32B 2605/00* (2013.01); *B32B 2605/08* (2013.01); *B60Y 2306/09* (2013.01); *B60Y 2410/122* (2013.01)

(58) Field of Classification Search
CPC .......... B32B 5/08; B32B 27/12; B32B 27/40; B32B 2262/0276; B32B 2262/0284; B32B 2262/12; B32B 2262/14; B32B 2274/14; B32B 2274/00; B32B 2307/724; B32B 2605/00; B32B 2605/08; B60K 11/00; B60R 13/04; B60R 13/0838; B60R 13/0861; G10K 11/162; B29K 2075/00; B29K 2105/08; B29K 2267/003; B29L 2031/302; B60Y 2306/09; B60Y 2410/122
See application file for complete search history.

(56) References Cited

U.S. PATENT DOCUMENTS

| | | | |
|---|---|---|---|
| 4,242,398 | A | 12/1980 | Segawa et al. |
| 4,435,015 | A | 3/1984 | Trotman et al. |
| 5,298,694 | A | 3/1994 | Thompson et al. |
| 5,387,382 | A | 2/1995 | Foettinger et al. |
| 5,493,081 | A | 2/1996 | Manigold |
| 5,509,247 | A | 4/1996 | Fortez et al. |
| 5,536,556 | A | 7/1996 | Juriga |
| 5,584,950 | A | 12/1996 | Gaffigan |
| 5,744,763 | A | 4/1998 | Iwasa et al. |
| 5,824,973 | A | 10/1998 | Haines et al. |
| 5,892,187 | A | 4/1999 | Patrick |
| 5,922,265 | A | 7/1999 | Parekh |
| 6,123,171 | A | 9/2000 | McNett et al. |
| 6,145,617 | A | 11/2000 | Alts |
| 6,177,180 | B1 | 1/2001 | Bodine et al. |
| 6,183,838 | B1 | 2/2001 | Kannankeril |
| 6,290,022 | B1 | 9/2001 | Wolf et al. |
| 6,631,785 | B2 | 10/2003 | Khambete et al. |
| 6,712,179 | B2 | 3/2004 | Bouyonnet |
| 6,955,845 | B1 | 10/2005 | Poole et al. |
| 7,318,498 | B2 | 1/2008 | Woodman et al. |
| 7,322,440 | B2 | 1/2008 | Khan |
| 7,677,358 | B2 | 3/2010 | Tocchi et al. |
| 8,256,572 | B2 | 9/2012 | Castagnetti |
| 8,545,965 | B2 | 10/2013 | Buska |
| 8,636,105 | B2 | 1/2014 | Castagnetti |
| 2003/0062738 | A1 | 4/2003 | Fujii et al. |
| 2004/0075290 | A1 | 4/2004 | Campbell |
| 2004/0131836 | A1 | 7/2004 | Thompson |
| 2005/0016793 | A1 | 1/2005 | O'Regan et al. |
| 2006/0113146 | A1 | 6/2006 | Khan et al. |
| 2007/0272482 | A1 | 11/2007 | Yamaguchi et al. |
| 2008/0073146 | A1 | 3/2008 | Thompson, Jr. et al. |
| 2009/0085378 | A1 | 4/2009 | Borchardt et al. |
| 2010/0065368 | A1 | 3/2010 | Tazian |
| 2010/0078927 | A1 | 4/2010 | Yuji |
| 2010/0230206 | A1 | 9/2010 | Tinianov et al. |
| 2013/0316102 | A1 | 11/2013 | Yoshida |

FOREIGN PATENT DOCUMENTS

| | | |
|---|---|---|
| DE | 4429627 | 2/1996 |
| EP | 0079253 | 5/1983 |
| EP | 0384420 | 8/1990 |
| EP | 0454949 | 11/1991 |
| EP | 0514616 | 11/1992 |
| EP | 1428656 | 6/2004 |
| EP | 1491327 | 12/2004 |
| EP | 2159786 | 3/2010 |
| EP | 2505788 A1 | 9/2012 |
| FR | 2908550 | 5/2008 |
| JP | 2001-310672 | 11/2001 |
| JP | 2001-347899 | 12/2001 |
| WO | WO 98/18656 | 5/1998 |
| WO | WO 99/35007 | 7/1999 |
| WO | WO 00/23269 A1 | 4/2000 |
| WO | WO 00/39201 A2 | 7/2000 |
| WO | WO 02/094616 | 11/2002 |
| WO | WO 03018291 | 3/2003 |
| WO | WO 03/078714 A2 | 9/2003 |
| WO | WO 2006/007275 | 1/2006 |
| WO | 2011032908 A1 | 3/2011 |
| WO | 2012126763 A2 | 9/2012 |

OTHER PUBLICATIONS

"Hyundai 130 1.6 CRDI IL PREZZO DELLA QUALITA," QUATTRORUOTE, 2008, Retrieved from http://www.quattroruote.it/prove/il-prezzo-della-qualita-hyurdai-i30-16_crdi, 2 pages.

"Hyundai i30, Kia Cee'd und VW Golf Wertkampf," Auto Motor-Sport, 2007, retrieved from http://www.auto-motor-und-sport.de/vergleichstest/hyundai-i30-kia-cee-d-und-vw-golf-wertkampf, 11 pages.

"Report on mechanical properties of porous materials," MATERIACUSTICA, 3, 2012, 6 pages.

Bertolini et al., "Transfer function based method to identify frequency dependent Young-Modulus, Poisson-Ratio and Loss-Factor of poro-elastic materials," Rieter Automotive Management AG, 2007, 5 pages.

Brouard et al., "A aeneral method for modelling sound propagation in layered media," Journal of Sound and Vibration, 1995, vol. 193(1), pp. 129-142, abstract only, 1 page.

Danilov et al., "On the limits of an 'in vacuum' model to determine the mechanical parameters of isotropic poroelastic materials," Journal of Sound and Vibration, 2004, vol. 276(3-5), 26 pages.

Hankook Pelzer Ltd., "Isolation Pad Assembly Dash Panel," 2007, 5 pages.

Hankook Pelzer Ltd., Invoice to Hyundai Motor Manufacturing Czech s.r.o., 2008, 3 pages.

Langlois et al., "Polynomial relations for quasi-static mechanical characterization of isotropic poroelastic materials," J. Acoustical Soc. Am., 2001, vol. 110(6), pp. 3032-3040.

Notice of Opposition opposing European Patent No. EP 2365483, dated Jan. 4, 2013, 29 pages.

Shim et al., Hyundai and Kia Engineering Standard—Material Specification—Dash Isolation Pad—Multi Absorption, Type, 2004, 10 pages.

(56) References Cited

OTHER PUBLICATIONS

International Preliminary Report on Patentability for International (PCT) Patent Application No. PCT/EP2015/058357, dated Nov. 10, 2016, 9 pages.
Extended European Search Report dated Aug. 25, 2010, regarding European Application No. 10155905.2, 5 pages.
Extended European Search Report dated Sep. 1, 2010, regarding European Application No. 10155903.7, 6 pages.
International Search Report for International (PCT) Patent Application No. PCT/EP2006/005861, dated Nov. 14, 2006, 3 pages.
Written Opinion for International (PCT) Patent Application No. PCT/EP2006/005861, dated Nov. 14, 2006, 8 pages.
International Search Report for International (PCT) Patent Application No. PCT/EP2003/01387, dated Apr. 6, 2004, 7 pages.
Notice of Allowance for U.S. Appl. No. 13/043,748, dated May 3, 2012, 7 pages.
Official Action for U.S. Appl. No. 13/565,497, dated Jan. 18, 2013, 10 pages.
Final Action for U.S. Appl. No. 13/565,497, dated Jul. 10, 2013, 5 pages.
Notice of Allowance for U.S. Appl. No. 13/565,497, dated Sep. 19, 2013, 8 pages.
Official Action for U.S. Appl. No. 11/917,385, dated Dec. 4, 2012, 9 pages.
Notice of Allowance for U.S. Appl. No. 11/917,385, dated Jul. 3, 2013, 9 pages.
Official Action for U.S. Appl. No. 10/538,494, dated Dec. 19, 2006, 9 pages.
Notice of Allowance for U.S. Appl. No. 10/538,494, dated Sep. 11, 2007, 5 pages.
Non-final office action from related U.S. Appl. No. 15/306,268, dated Feb. 6, 2018.
International Search Report and Written Opinion prepared by the European Patent Office dated Jun. 9, 2015, for International Application No. PCT/EP2015/058358.

EXTERIOR TRIM PART

CROSS REFERENCE TO RELATED APPLICATIONS

This application is a national stage application under 35 U.S.C. 371 and claims the benefit of PCT Application No. PCT/EP2015/058357 having an international filing date of 17 Apr. 2015, which designated the United States, which PCT application claimed the benefit of European Patent Application No. 14166482.1 filed 29 Apr. 2014, the disclosure of each of which are incorporated herein by reference.

TECHNICAL FIELD

The invention is directed to a trim part for a vehicle. The trim part is in particularly suited for use on the exterior lower region of the car, in particularly as a cladding under the car, in the area of the engine as under engine shield or under the main area as a underbody trim part.

In the last decade the car industry started covering the car side facing the road with cladding or so called trim parts. The reduction of road noise coming from the tires on the road as well as optimising the aerodynamics of the region under the car are partly the reasons for doing so.

Many of these trim parts are formed or moulded to a 3-dimensional shape to follow the geometry of the body section they are intended to cover. Often, 3-dimensional moulds and heat energy are used to shape the trim part. These type of trim parts—underbody trim parts and/or under engine shields—are 3-dimensional structural parts that need to keep their structure when mounted under the car, without showing a predefined level of sagging during use. Depending on the car type, these parts must be able to span a larger distance or area without unacceptable sagging. Furthermore these parts should be able to function in a harsh environment over the entire life of the car, for instance they are subjected to stone chipping, hot, cold and/or wet weather conditions and might also collide with road obstacles during use. In addition the part close to the power train is exposed to high temperatures.

Many of these parts are made as injection moulded plastic parts, sometimes between the plastic carrier and the vehicle floor covered with a sound absorbing material to enhance acoustic performance. These parts are overall heavy. The trend is to go for lighter parts to reduce the overall weight of the car and therefore the fuel consumption.

There are underbody trim parts on the market made of a porous core layer, whereby the core layer contains glass fibres bound by a thermoplastic binder. As thermoplastic binder polypropylene, polyester or a resinous type are used. The structural stiffness is essentially coming from the use of glass fibres. Glass fibres are less popular in recent years as exposure to the fibres during the production of the parts as well as the assembly of the parts in the car, can pose a health issue for the people handling the material.

The parts currently on the market are heavy in general, or the material used causes other problems.

There is a need for alternative materials and for lighter versions of such trim parts which however are able to withstand the same conditions and are having an acoustic function.

SUMMARY OF INVENTION

It is an object of the present invention to provide an improved exterior trim part, particularly a trim part for covering the body of the car facing the road.

This object is achieved by the respective teaching of the independent claims. Advantageous developments constitute the subject matter of the dependent claims.

In accordance with a first aspect of the invention, an exterior trim part for a vehicle comprises a fibrous porous structural layer. The exterior trim part further comprises at least a perforated film layer, which is made of thermoplastic polyurethane (TPU) with a melting temperature according to DSC of at least 140° C. The film layer is materially connected to the fibrous porous structural layer.

The porous fibrous structural layer can be covered partially of fully with the perforated film according to the invention.

Unexpectedly, a thermoplastic polyurethane perforated film with a melting temperature according to DSC of at least 140° C. maintains essentially its two-dimensional shape as a film layer and therefore the perforations while melting enough to materially connect to the fibrous structural layer. Therefore the airflow resistance of the overall trim part can be anticipated.

With many of the film materials used so far, the material melts largely during the moulding process. The film disintegrates largely and is wicked into the surrounding fibres of the structural fibrous layer, therefore the integrity of the film layer is largely lost and the perforation is no longer effective in the final product. Although the final product will show an increased airflow resistance it will be patchy and unpredictable.

By combining the fibrous porous structural layer with the perforated film layer according to the present invention, the sound absorption of the exterior trim part is increased in comparison with the sound absorption of the fibrous porous structural layer by itself. Furthermore, the air flow resistance is more evenly spread over the trim part following the original pattern of perforation present on the film.

By combining the fibrous porous structural layer with the perforated film layer, the flow resistance [N·s/m³] imposed on an airflow (airflow resistance or "AFR") through a main plane P, as explained in the following, is increased which may improve the exterior trim part's ability to absorb sound. It is assumed that the exterior trim part or its fibrous porous structural layer essentially extends in a 2-dimensional main plane P, at least prior to optional 3-dimensional forming of the exterior trim part in a mould, which is explained later.

Definitions

Within the scope of the present invention bending stiffness is understood as a property of a body to be bent, indicating the body's curvature when a bending torque is imposed. Bending stiffness [N·mm²] is calculated as the body's material's elastic modulus E· the second moment of area I of the body's cross section about the bending axis. Alternatively, bending stiffness may be determined experimentally by a method according to DIN 53362.

The bending stiffness of the exterior trim part is determined largely by the fibrous porous structural layer. Its cross-section is designed to avoid unacceptable sagging of the exterior trim part when held at or near its edges in an essentially horizontal plane.

Within the scope of the present invention the melting temperature of a polymer such as polyurethane or polyester is the least temperature [° C.] at or above which the polymer runs through a transition from a crystalline or semi-crystalline phase to a solid amorphous phase. The melting temperature of polymers or the film layer shall be measured using Differential Scanning Calorimetry (DSC) according to ISO 11357-3.

Within the scope of the present invention the AFR or airflow resistance, that is the exterior trim part's resistance to an airflow through the above main plane P, is measured with an "Airflow Resistance Measurement System" or CARE+ system commercially available from Autoneum Management AG. Alternatively, the AFR is measured according to DIN EN 29053 or DIN 9053 method A.

Within the scope of the present invention, an exterior trim part is understood as a part serving to cover a section of the vehicle body, which may be connected to the vehicle body, in particular to the vehicle's underbody—the side of the vehicle that is facing the road. The underbody trim part can be formed as one part or as many parts together covering the surface of the underbody. Further within the scope of the present invention an exterior trim part can also mean a trim part that covers a part under the engine bay area, in particularly as an under engine shield. However the exterior trim part can also cover other areas of the exterior of the car that is subject to the same or similar conditions.

Within the scope of the present invention, a filament is defined as a continuous fibre with an indefinite length. Filaments, as defined, are also known as endless filaments or continuous filaments. Endless filaments are e.g. laid on a surface directly after production, like for instance a moving belt, thus forming a fibrous layer.

This fibrous layer can be used as a semi-finished material for the production of trim parts. Further processing of such semi-finished material can include cutting steps, hence endless filaments is not to be taken in the literal meaning of the word endless, but means a filament with a length that may extend throughout the part formed. In particularly excluded are cut melt-spun filaments forming staple fibres.

Staple fibres are produced the same as filaments however are cut after production and baled for later use. Before cutting, staple fibres may be crimped for easier processing. Using additional process steps as known by the skilled person, for instance via carding-cross lapping or air laid processes a fibrous mat may be formed. This mat can be used to further produce the product according to the current invention.

Within the scope of the present invention staple fibres are mono- or bicomponent fibres, preferably with a round or contoured or trilobal cross section. They are normally made by a melt spinning process, whereby the material is molten, extruded, passed through a spin pack to obtain the desired cross section and cooled. Preferably, the process includes drawing steps or crimping steps to further enhance the filament. The filament is cut into staple fibres of a predefined length. When a fibres mixture is used, the fibres are mixed before forming the fibrous layer.

Within the scope of the present invention bicomponent filaments or staple fibres may be formed of two polymers combined to form filaments or fibres having a core of one polymer and a surrounding sheath of the other polymer. In particular, the bicomponent filaments or fibres may be arranged in a sheath-core, side-by-side, islands-in-the-sea, or segmented-pie arrangement. In addition the filament or fibres can have different cross-section, preferably the filaments or fibres used have a round, or contoured or trilobal cross-section. The production of bicomponent filament or fibres is known in the art, see for instance the Fibre Table according to P.-A. Koch (2008, Shaker Verlag, ISBN 978-38322-7037-7). The first polymer has a melting temperature according to DSC lower than the melting temperature according to DSC of the second polymer so that upon heating of the bicomponent filaments or fibres, the first and second polymers react differently. For example, when the bicomponent filaments or fibres are heated to a temperature that is above the softening or melting temperature according to DSC of the first polymer (the sheath polymer) and below the melting temperature according to DSC of the second polymer (the core polymer), the first polymer will soften or melt while the second polymer doesn't. This softening of the first polymer will cause the first polymer to become sticky and bond to filaments and or staple fibres that may be in close proximity. The core polymer stays intact and forms a network of filaments or staple fibres in the final product.

Within the scope of the present invention PET (polyethylene terephthalate) is understood as a member of the polyester family of polymers. Polyester is a family of polymers which contain ester functional groups in their main chain. Polyesters are generally prepared by the reaction of dicarboxylic acids with glycols. PET is essentially prepared using terephthalic acid and monoethylene glycol.

Within the scope of the present invention a CoPET is understood as a modified polyethylene terephthalate, where small amounts of additional monomers are used during polymerisation to reduce the melting temperature according to DSC in comparison to PET. Commonly used additional monomers are diethylene glycol or iso-phthalic acid.

The Fibrous Porous Structural Layer

In case the used bicomponent filament is of the core-sheath type, the first named polymer is the sheath the second the core polymer.

Preferably, the fibrous porous structural layer according to the invention is made of a combination of PET and CoPET, whereby the Copolyester (CoPET) used has a melting temperature according to DSC of at least 190° C. and preferably the polyester used has a melting temperature of at least 240° C.

The PET and CoPET can be combined in one filament or fibre as a bicomponent filament or bicomponent fibre, or can be a mixture of PET and CoPET monocomponent fibres. Also, there can be a mixture of PET monocomponent filaments or fibres, and bicomponent filaments or fibres with CoPET.

Preferably, the fibrous porous structural layer:
1. consists of bicomponent filaments with a CoPET sheath with a melting temperature of at least 150° C., preferably at least 170° C., preferably at least 190° C., and with a PET core with a melting temperature of at least 240° C., or
2. consists of bicomponent staple fibres with a CoPET sheath with a melting temperature of at least 150° C., preferably at least 170° C., preferably at least 190° C., and with a PET core with a melting temperature of at least 240° C., or
3. comprises first bicomponent staple fibres with a CoPET sheath with a melting temperature of at least 150° C., preferably at least 170° C., preferably at least 190° C., and with a PET core with a melting temperature of at least 240° C., or
4. according to No. 3 further comprises second bicomponent staple fibres consisting of a CoPET sheath with a melting temperature of at least 20° C. lower than the melting temperature of the sheath of the first bicomponent staple fibres, or
5. according to No. 3 or No. 4 further comprises PET staple fibres with a melting temperature of at least 240° C. and/or CoPET staple fibres, or
6. comprises a mixture of staple fibres with CoPET staple fibres with a melting temperature of at least 150° C., preferably at least 170° C., preferably at least 190° C., and with PET staple fibres with a melting temperature of at least 240° C.

"Sheath" of the above embodiments of the fibrous porous structural layer shall be understood as a first polymer of the staple fibres or filaments independent of the arrangement of at least two polymers within the staple fibres or filaments.

"Core" of the above embodiments of the fibrous porous structural layer shall be understood as a second polymer of the staple fibres or filaments independent of the arrangement of at least two polymers within the staple fibres or filaments.

Preferably, the fibrous porous structural layer:
1. consists of bicomponent filaments with a CoPET first polymer with a melting temperature of at least 150° C., preferably at least 170° C., preferably at least 190° C., and with a PET second polymer with a melting temperature of at least 240° C., or
2. consists of bicomponent staple fibres with a CoPET first polymer with a melting temperature of at least 150° C., preferably at least 170° C., preferably at least 190° C., and with a PET second polymer with a melting temperature of at least 240° C., or
3. comprises first bicomponent staple fibres with a CoPET first polymer with a melting temperature of at least 150° C., preferably at least 170° C., preferably at least 190° C., and with a PET second polymer with a melting temperature of at least 240° C., or
4. according to No. 3 further comprises second bicomponent staple fibres consisting of a CoPET first polymer with a melting temperature of at least 20° C. lower than the melting temperature of the first polymer of the first bicomponent staple fibres, or
5. according to No. 3 or No. 4 further comprises PET staple fibres with a melting temperature of at least 240° C. and/or CoPET staple fibres, or
6. comprises a mixture of staple fibres with CoPET staple fibres with a melting temperature of at least 150° C., preferably at least 170° C., preferably at least 190° C., and with PET staple fibres with a melting temperature of at least 240° C.

Preferably, the bicomponent filaments or staple fibres are formed in a sheath-core arrangement in which the sheath is formed of a first polymer, which substantially surround the core formed of a second polymer. It is not required that the sheath polymer totally surround the core polymer.

Staple length, a property of staple fibres, is a term referring to the average length of a group of fibres of any composition. Preferably, some, most or all of the staple fibres have a staple length between 10 and 150 mm. Preferably, the staple fibre with the longest staple length is formed from the PET with the highest melting temperature.

Preferably, the staple fibres or filaments used have a diameter between 10 and 40 μm, more preferably between 18 and 30 μm.

Preferably, the percentage by weight of CoPET polymer in the mixture is between 5 and 50%, preferably between 20 and 35%. The CoPET polymer forms either separate staple fibres or the sheaths of staple fibres or the sheaths of filaments.

Preferably, the staple fibre mixture of variants 3 or 4, can comprise other fibres to form bulk, up to 20% of the total weight of the fibrous mixture. Preferably, this is polypropylene, cotton or polyamide staple fibres.

According to a preferred development, the sectional weight [g/m$^2$], hereinafter named "area weight" (AW), of the fibrous porous structural layer is between 500 and 2,500 g/m$^2$. The preferred development may offer the advantage that the weight of the exterior trim part is reduced.

According to a preferred development, the desired AFR of the fibrous porous structural layer is between 200 and 2,500 N·s/m$^3$, which may vary throughout the trim part. The preferred development may offer the advantage that the sound absorption of the exterior trim part is improved.

According to a preferred development, the desired thickness of the fibrous porous structural layer is between 1.5 and 10 mm, which may vary throughout the trim part. The preferred development may offer the advantage that the mechanical and/or acoustic properties are improved.

According to a preferred development, the fibrous porous structural layer has a bending stiffness (Young's modulus E· second moment of area I) of more than 15.000 N·mm$^2$, which may be determined by a method according to DIN 53362.

Preferably, the porous structural fibrous layer substantially does not contain glass fibres or other mineral fibres.

Thermoplastic Polyurethane Film

Within the scope of the present invention thermoplastic polyurethane (TPU) is understood as an elastomer, the essentially linear primary chains of which have segmented structures. Within the same primary chain "soft segments", which may stretch reversibly, alternate with "hard segments". The polarity of the hard segments creates a strong attraction between them, which causes a high degree of aggregation and order in this phase, forming crystalline or pseudo crystalline areas located in a soft and flexible matrix. The crystalline or pseudo crystalline areas act as physical cross-links. The TPU is understood not to be foamed. The thermoplastic polyurethane is preferably based on polyester or polyether. In contrast, thermoset polyurethane comprises covalent bonding between primary chains in the soft segments.

By choosing a TPU with a melting temperature according to DSC above 140° C. the film is melting enough during moulding to become sticky but not enough to form droplets and wick into the surrounding material.

According to a preferred development, the melting temperature according to DSC of the film layer is less than a melting temperature according to DSC of the fibrous porous structural layer. The preferred development may offer the advantage that the film layer still reduces the airflow rate through the exterior trim part after connecting the film layer and the fibrous porous structural layer. The preferred development may offer the advantage that the perforation of the film layer essentially remains air permeable after connecting the film layer and the fibrous porous structural layer.

Preferably, the melting temperature according to DSC of the thermoplastic polyurethane is greater than 150° C., more preferably greater than 160° C.

Preferably, the melting temperature of the TPU film is smaller than 220° C.

Unexpectedly, the film layer is not disintegrating during the moulding process, instead remains largely intact. In addition the perforation does not have a negative impact on the film, for instance the perforation itself does not form the source of tearing during 3-dimensional moulding of the trim part. The preferred development may offer the advantage that the film layer remains essentially a film during the connection of the fibrous porous structural layer with the film layer.

Surprisingly, the elasticity of the TPU film in addition may prevent the film from cracking or tearing during the 3-dimensional moulding offering the advantage of an intact film layer that maintains its air flow resistance, albeit a small difference between the AFR of the film before and after moulding might be observed without diverting from the invention as anticipated.

According to a preferred development, the perforation of the film layer comprises, at least in sections, a perforation density of more than 150,000 holes/m², preferably more than 200,000 holes/m², preferably less than 750,000 holes/m². By increasing or decreasing the holes/m² the air flow resistance over the exterior trim part may be designed to reflect the AFR needed to obtain the sound absorption wanted.

According to a preferred development, the perforation of the film layer, at least in sections, comprises holes the cross sectional area of which corresponds to essentially cylindrical holes with a diameter between 10 and 1000 µm. The preferred development may offer the advantage that the sound absorption of the exterior trim part is improved.

According to a preferred development, the perforation of the film layer, i.e. its perforation density and size, is chosen such that the AFR of the exterior trim part is between 1,000 and 4,500 N·s/m³, more preferably between 1,500 and 2,500 N·s/m³. The preferred development may offer the advantage that the sound absorption of the exterior trim part is improved.

According to a preferred development, the thickness of the exterior trim part is in the range between 1.5 to 10 mm, at least in sections.

According to a preferred development, the film layer is not perforated but nevertheless air permeable, preferably within the moulded exterior trim part. This may offer the advantage, that the effect of the film layer to cover the fibrous porous structural layer against moisture or dirt is improved.

According to a preferred development, the film layer is only partially perforated, preferably within the moulded exterior trim part, thereby creating areas of no air permeability. This may offer an advantage in areas where the airflow through the part is interfering with the thermal management of the vehicle.

Additional Layers

According to a preferred development, the exterior trim part further comprises scrim layer which is, preferably materially, connected to the film layer. The film layer is arranged, at least in sections, between the scrim layer and the fibrous porous structural layer. The scrim layer is permeable to fluids such as air. The scrim layer does not significantly contribute to the AFR of the exterior trim part.

Preferably, a scrim layer consist of thermoplastic fibrous material.

Preferably, the melting temperature according to DSC of the scrim layer's material is greater than the melting temperature according to DSC of the film layer's material. The area weight of the scrim layer can be between 15 and 250 g/m², preferably between 50 and 150 g/m².

Preferably, the scrim layer can be made from filaments or staple fibres or mixtures of staple fibres. Preferably, the fibres are made by meltblown or spunbond technology. These type of scrim layers are also known as nonwoven layers. Preferably, the material chosen is heat stable over long time thermal load exposure. Preferably, the scrim layer's fibres are made of polyester, or polyamide, or oxidised, thermally stabilised polyacrylonitrile (PAN, also known as PANox) or a combination of fibres for instance of polyester and cellulose, or polyamide and polyester. Preferably, the scrim layer can be treated with the usual treatment necessary for the area of appliance, like for instance oil repellency, water repellency, flammability treatment etc. A preferred example of a scrim layer can be a nonwoven scrim layer made of polyester fibres.

A preferred example of a scrim layer can be a nonwoven scrim layer made of the same or similar material as the fibrous structural layer.

It was found that the thermoplastic polyurethane of the film layer permits the lamination of a further layer, such as the scrim layer. A separate adhesive as well as the associated cost and effort can be avoided.

The preferred development may offer the advantage that the exterior trim part can be removed more easily from a mould after moulding.

According to a preferred development, the exterior trim part further comprises a heat reflective layer which is particularly materially connected to either the fibrous porous structural layer, the TPU film layer or the scrim layer. Preferably, the heat reflective layer covers only a section of the exterior trim part. Preferably, the heat reflective layer comprises a metal, more preferred aluminium or an aluminium alloy. Preferably, the heat reflective layer forms a further layer of the exterior trim part.

It was found that the thermoplastic polyurethane of the film layer permits the lamination of a further layer, such as the heat reflective layer, to the fibrous porous structural layer's material. A separate adhesive as well as the associated cost and effort can be avoided.

The preferred development may offer the advantage that the resistance of the exterior trim part to temperatures above 160° C., e.g. in an engine compartment of a vehicle or near its exhaust, is improved. The preferred development may offer the advantage that the exterior trim part may be used in an engine compartment of a vehicle or near its exhaust, for instance as an under engine shield.

The exterior trim part is manufactured with layering at least the fibrous porous layer, forming the fibrous porous structural layer after moulding, and the film layer, which is made of thermoplastic polyurethane with a melting temperature according to DSC of at least 140° C., in a mould. The layers are treated with heat (heat treatment), for instance with pressurised steam of a predetermined temperature, inside the mould such that the CoPET content of the fibrous layer softens and/or melts as well as the film layer. A force driving the layers towards each other is imposed, which may, where necessary, compress the fibrous material and form the 3-dimensional shape of the exterior trim part. The exterior trim part is cooled in the moulding tool and the layers materially connect to each other.

The heat treatment can be done by hot moulding or by preheating the materials with infrared heating or contact heating followed by moulding in preferably a hot tool.

It was found that by choosing thermoplastic polyurethane with the specified melting temperature according to DSC the essentially two-dimensional shape of the film layer is largely maintained and the perforation of the film layer essentially remains air permeable after connecting the film layer and the fibrous porous layer.

Unexpectedly, a thermoplastic polyurethane perforated film with a melting temperature according to DSC of at least 140° C. maintains essentially its two-dimensional shape as a film layer and therefore the perforations while melting enough to materially connect to the fibrous structural layer. Therefore the airflow resistance of the overall trim part can be anticipated.

Additional layers, such as the scrim layer or the heat reflective layer, can be added before closing the mould.

It was found that the thermoplastic polyurethane of the film layer permits the lamination of a further layer, such as the scrim layer or a heat reflective layer, by the softened fibrous porous structural layer's material even when the film layer separates the further layer from the fibrous porous structural layer. A separate adhesive as well as the associated cost and effort can be avoided.

The exterior trim part can be used as an engine bay covering panel, a top-, side- or undercover for an engine, an oil pan cover, an under engine shield, a fire wall, an at least partially covering outer dash panel, an air guiding panel behind the cooler of the engine bay or a vehicle's underbody covering panel, an outer wheel arch liner or as an automotive exterior trim part.

Preferably, the fibrous porous structural layer is positioned near, adjacent or in physical contact with the vehicle's underbody, while the perforated film layer faces the source of the noise. This may offer the advantage of an improved sound absorption.

Preferably, the structural stiffness is due to the fibrous material of the porous fibrous structural layer. The stiffness may be enhanced by advantageous design feature of the 3D trim part for instance by incorporating carefully placed ribs of compressed areas. Preferably, the stiffness of the final part is not due to the use of glass or mineral fibres.

BRIEF DESCRIPTION OF DRAWINGS

Further advantages, features and applications of the present invention become apparent from the following description referring to the figures, showing.

FIG. 1a shows an exploded view of the exterior trim part 1 according to the first aspect of the invention. The thicknesses of the layers are not drawn to scale. The fibrous porous structural layer 2 is connected with the perforated film layer 3.

FIG. 1b shows a preferred development of the exterior trim part 1 of FIG. 1. The thicknesses of the layers are not drawn to scale. This exterior trim part 1 has a scrim layer 4. The film layer 3 is arranged between the fibrous porous structural layer 2 and the scrim layer 4. The scrim layer 4 is materially connected to the film layer 3. The scrim layer 4 serves to protect the film layer 3 and to simplify the removal of the exterior trim part 1 from a mould during manufacturing.

FIG. 1c shows a further preferred development of the exterior trim part 1 of FIG. 1. The thicknesses of the layers are not drawn to scale. This exterior trim part 1 has a heat reflective layer 6. The film layer 3 is arranged between the fibrous porous structural layer 2 and the heat reflective layer 6. The heat reflective layer 6 is materially connected to the film layer 3. The heat reflective layer 6 is designed with one or several patches 6a, 6b which are arranged to face hot parts of a vehicle, such as the exhaust.

FIG. 2 shows a plot of sound absorption [-] depending on the frequency. The dashed line shows the fibrous porous structural material without the film layer (reference). The solid line shows the fibrous porous structural layer with the film according to the invention (invention). For the reference an average value of 646 N·s/m3 was measured over the specimen. For the invention an average value of 2,120 N·s/m3 was measured over the specimen. When measuring the sound absorption, the microphone was located on the film side of the exterior trim part. The fibrous porous layer of the tested specimens had a nominal area weight of 1,000 g/m2 and the nominal thickness of the specimens was 4 mm. By using fibrous porous structural layer together with the film layer according to the invention the sound absorption was significantly improved within the range shown. When measuring the sound absorption, the microphone was located on the film side of the exterior trim part. The fibrous porous layer of the tested specimens had a nominal area weight of 1,000 g/m$^2$ and the nominal thickness of the specimens was 4 mm. By using fibrous porous structural layer together with the film layer according to the invention the sound absorption was significantly improved within the range shown.

FIG. 3 shows a drawing of the underside of a car. The exterior trim part according to the invention can be used for example as under engine shield 7 or as panelling under the main floor, also known as under-body panel 8. Preferably, the exterior trim part for instance the underbody panel 8 can be divided in more than one part to enable a better handling or optimise on transport.

Figure 1:
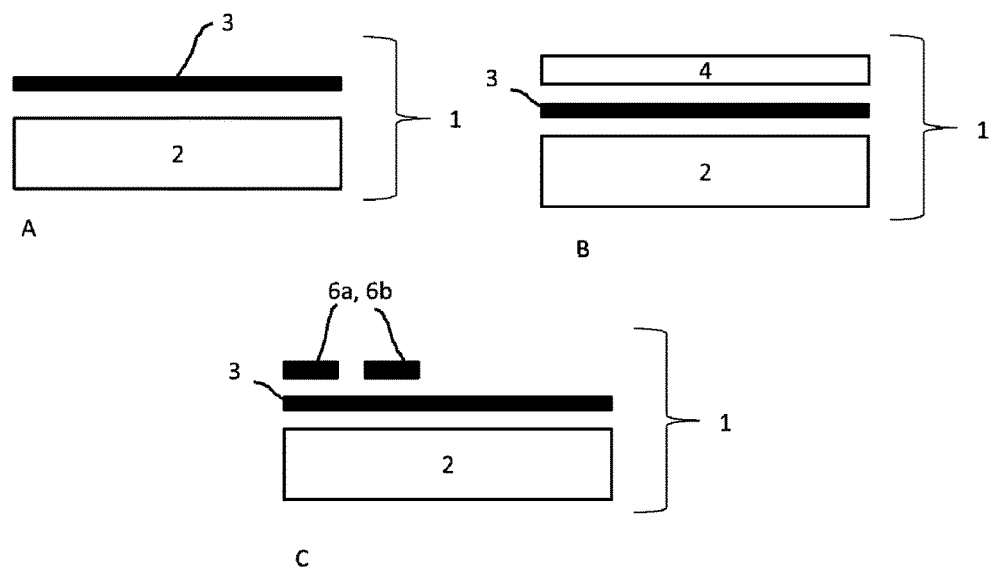
FIG. 1a to 1c schematically show cross sections of the exterior trim part.
Figure 2:
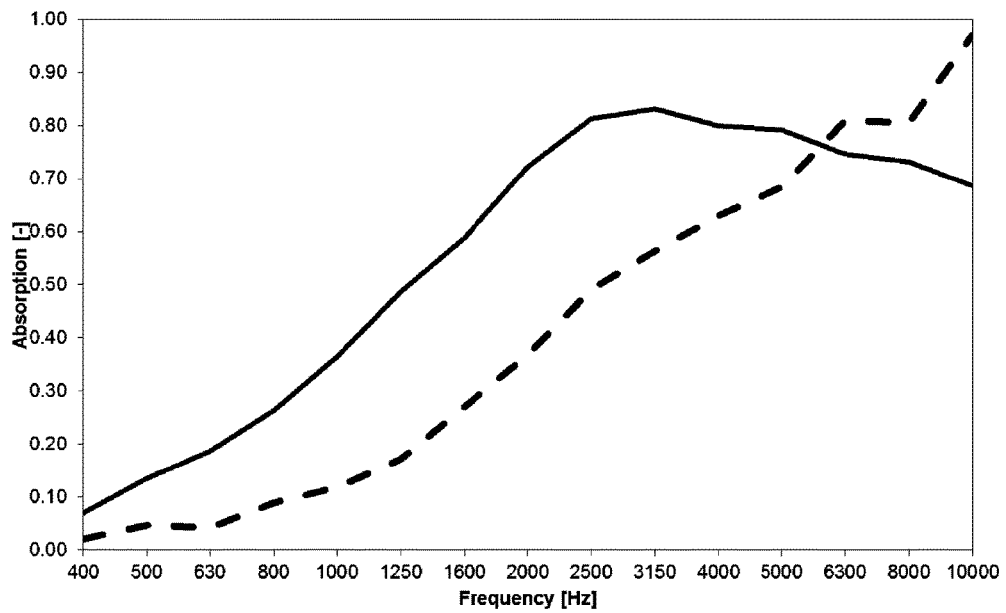
FIG. 2 a plot of sound absorption.
Figure 3:
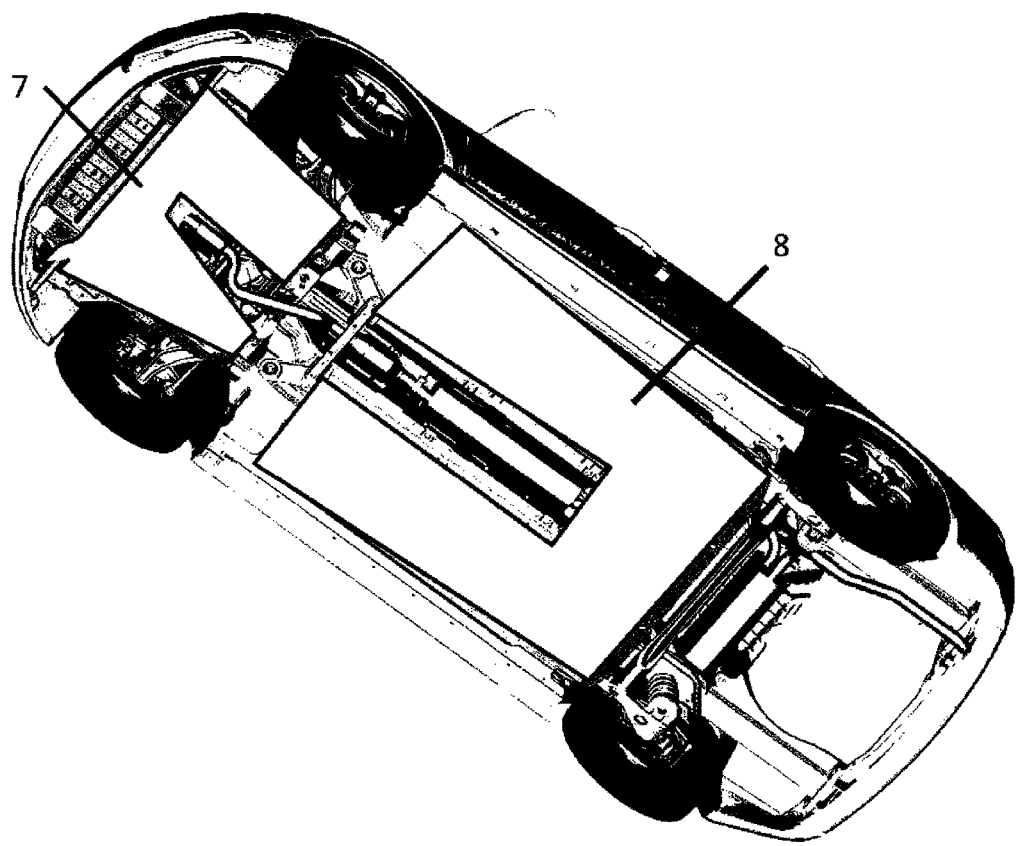
FIG. 3 shows a drawing of the underside of a car.

REFERENCE SIGN LIST 1 exterior trim part
2 fibrous porous structural layer
3 film layer
4 scrim layer
6 heat reflective layer
7 under engine shield
8 underbody panel

What is claimed is:

1. An exterior trim part for a vehicle, comprising:
   a fibrous porous structural layer; and
   at least one perforated film layer materially connected to said fibrous porous structural layer, said at least one perforated film layer being made of non-foamed thermoplastic polyurethane with a melting temperature according to DSC of at least 140° C.

2. The exterior trim part according claim 1, wherein the fibrous porous structural layer consists of bicomponent filaments with a CoPET first polymer with a melting temperature of at least 150° C., preferably at least 190° C., and a PET second polymer with a melting temperature of at least 240° C.

3. The exterior trim part according claim 1, wherein the fibrous porous structural layer consists of bicomponent staple fibres with a CoPET first polymer with a melting temperature of at least 150° C., preferably at least 190° C., and a PET second polymer with a melting temperature of at least 240° C.

4. The exterior trim part according claim 1, wherein the fibrous porous structural layer comprises first bicomponent staple fibres with a CoPET first polymer with a melting temperature of at least 150° C., preferably at least 190° C., and a PET second polymer with a melting temperature of at least 240° C.

5. The exterior trim part according claim 4, wherein the fibrous porous structural layer further comprises second bicomponent staple fibres with a CoPET first polymer with a melting temperature of at least 20° C. lower than the melting temperature of the first polymer of the first bicomponent staple fibres.

6. The exterior trim part according to claim 4, wherein the fibrous porous structural layer further comprises PET staple fibres with a melting temperature of at least 240° C. or CoPET staple fibres.

7. The exterior trim part according claim 1, wherein the fibrous porous structural layer comprises a mixture of CoPET staple fibres with a melting temperature of at least 150° C., preferably at least 190° C., and PET staple fibres with a melting temperature of at least 240° C.

8. The exterior trim part according to claim 2, wherein the first polymer forms the sheath of a filament, wherein the PET second polymer forms the core of the filament.

9. The exterior trim part according to claim 1, wherein the thermoplastic polyurethane film is based on polyether or polyester.

10. The exterior trim part according to claim 1, wherein the exterior trim part has a total thickness between 1.5 and 10 mm and has an airflow resistance (AFR) in the direction of thickness between 1,000 to 4,500 N·s/m³.

11. The exterior trim part according to claim 1, wherein the perforated film layer is only partially perforated.

12. The exterior trim part according to claim 1, further comprising a scrim layer connected to the at least one perforated film layer.

13. A method of using an exterior trim part according to claim 1 as an engine bay covering panel, a top of an engine, a side of an engine, an undercover for an engine, an oil pan cover, an under engine shield, a fire wall, an at least partial outer dash panel covering, an air guiding panel located behind a cooler of the engine bay or a vehicle's underbody covering panel, an outer wheel arch liner, or as an automotive exterior trim part.

14. The exterior trim part according to claim 1, wherein the non-foamed thermoplastic polyurethane is elastomeric.

15. The exterior trim part according to claim 3, wherein the first polymer forms the sheath of a staple fibre, wherein the PET second polymer forms the core of the staple fibre.

16. An exterior trim part for a vehicle, comprising:
a fibrous porous structural layer; and
at least one air permeable film layer materially connected to said fibrous porous structural layer, said at least one air permeable film layer being made of non-foamed thermoplastic polyurethane with a melting temperature according to DSC of at least 140° C.

17. The exterior trim part according claim 16, wherein the fibrous porous structural layer comprises first bicomponent staple fibres with a CoPET first polymer with a melting temperature of at least 150° C., preferably at least 190° C., and a PET second polymer with a melting temperature of at least 240° C.; and
wherein the fibrous porous structural layer further comprises second bicomponent staple fibres with a CoPET first polymer with a melting temperature of at least 20° C. lower than the melting temperature of the first polymer of the first bicomponent staple fibres.

18. The exterior trim part according claim 16, wherein the fibrous porous structural layer comprises first bicomponent staple fibres with a CoPET first polymer with a melting temperature of at least 150° C., preferably at least 190° C., and a PET second polymer with a melting temperature of at least 240° C.; and
wherein the fibrous porous structural layer further comprises PET staple fibres with a melting temperature of at least 240° C. or CoPET staple fibres.

19. The exterior trim part according claim 16, wherein the fibrous porous structural layer comprises a mixture of CoPET staple fibres with a melting temperature of at least 150° C., preferably at least 190° C., and PET staple fibres with a melting temperature of at least 240° C.

20. The exterior trim part according to claim 16, wherein the air permeable film layer is only partially air permeable.

* * * * *